United States Patent
Gotoh et al.

(10) Patent No.: US 7,548,341 B2
(45) Date of Patent: Jun. 16, 2009

(54) IMAGE PROCESSING DEVICE, IMAGE READING DEVICE, IMAGE FORMING DEVICE, AND IMAGE PROCESSING METHOD

(75) Inventors: Makio Gotoh, Nara (JP); Kenji Kimura, Nara (JP); Masanori Minami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 999 days.

(21) Appl. No.: 10/889,853

(22) Filed: Jul. 13, 2004

(65) Prior Publication Data

US 2005/0012948 A1    Jan. 20, 2005

(30) Foreign Application Priority Data

Jul. 16, 2003    (JP) ............... 2003-197919

(51) Int. Cl.
  *G06F 15/00*    (2006.01)
  *G06K 1/00*    (2006.01)
  *H04N 1/60*    (2006.01)
  *G03F 3/08*    (2006.01)

(52) U.S. Cl. ...................... 358/1.9; 358/518

(58) Field of Classification Search .............. 358/1.9, 358/518, 1.2, 1.18, 1.6
See application file for complete search history.

(56) References Cited

U.S. PATENT DOCUMENTS

| | | | |
|---|---|---|---|
| 5,664,072 A * | 9/1997 | Ueda et al. | 358/1.9 |
| 5,900,860 A * | 5/1999 | Ueda | 345/600 |
| 7,002,624 B1 | 2/2006 | Uchino et al. | |
| 2002/0145745 A1* | 10/2002 | Kanno | 358/1.9 |

FOREIGN PATENT DOCUMENTS

| | | |
|---|---|---|
| JP | 2000-321686 | 11/2000 |
| JP | 2001-086354 | 3/2001 |
| JP | 2002-094814 | 3/2002 |
| JP | 2003-102031 | 4/2003 |

* cited by examiner

*Primary Examiner*—Douglas Q Tran
(74) *Attorney, Agent, or Firm*—Renner, Otto, Boisselle & Sklar, LLP

(57) ABSTRACT

An original is illuminated by a light source α or a light source β, and image data is obtained under these conditions. An absolute value of a difference between image data under these different conditions is compared to a threshold value, and it is judged whether or not a color-unmatch occurs. If the color-unmatch occurs, the color-unmatch is corrected in accordance with a plurality of image data read under different conditions.

8 Claims, 6 Drawing Sheets

IMAGE PROCESSING DEVICE, IMAGE READING DEVICE, IMAGE FORMING DEVICE, AND IMAGE PROCESSING METHOD

This Nonprovisional application claims priority under 35 U.S.C. § 119(a) on Patent Application No. 197919/2003 filed in Japan on Jul. 16, 2003, the entire contents of which are hereby incorporated by reference.

FIELD OF THE INVENTION

The present invention relates to an image processing method and image processing device which read image data under a plurality of different conditions, and process and convert the input image data read under the respective conditions into image data in a reference color space. The present invention also relates to an image forming device adopting the method or the apparatus, to a program for realizing the method or the apparatus, and to a recording medium in which the program is stored.

BACKGROUND OF THE INVENTION

Recently, an office automation apparatus has rapidly been going digital and the demand for color image output has been increasing. This causes output devices, such as digital color copying machines of an electrophotographic type and color printers of an ink jet type or a thermal transfer type, to have been generally and widely used. For example, these output devices are used to output (i) image information supplied from an input device such as a digital camera or a scanner, or (ii) image information created on a computer.

Input images (original), read by an input device such as the scanner, have various printing methods. Incidentally, a layer structure of an image surface or a composition of a color material may cause a phenomenon called a color-unmatch. According to such a phenomenon, colors between which the human eye cannot discern are read and recognized by the scanner, etc., as image data having respective different colors. If such a phenomenon occurs, then the image to be outputted is reproduced in colors different from those of the input image. This causes the image quality to be deteriorated. In view of the circumstances, a variety of techniques have been proposed so as to solve this kind of problem.

Note that, the color-unmatch here occurs when "metamerism" is no longer satisfied. The "metamerism" indicates a state where colors, whose light sources have different spectral distributions from one another, are recognized as the same one. Further, the "metamerism" includes a state where the human eye cannot discern between two colors whose spectral reflectances are different from each other. The "metamerism" also includes a state where two input signals, sensed with respect to two different colors having different spectral reflectances from each other by a sensor, which has a different spectral sensitivity from that of the human eye, become unrecognizable.

This phenomenon is applied to output devices such as scanners or printers, and these output devices carry out color-matching by realizing the metamerism. However, there is a possibility that colors between which the human eye cannot discern are reproduced as different colors (color-unmatch), when such colors are read by the scanner and the respective image data are outputted by the output device. In this case, the metamerism is satisfied in the human eye, but the metamerism is not satisfied in the sensor of the scanner.

Generally, reading characteristics of a scanner are adjusted such that, in case of displaying images on a display device such as a display, most images recognized on the display device are the same ones as those actually recognized by the human eye. In other words, the reading characteristics of a scanner is adjusted such that the color-unmatch between the human eye and the sensor of the scanner is small. As such, the color-unmatch does not occur on most output originals (namely, the metemerism is satisfied between the scanner and the human eye). However, when a particular color material is used, the phenomenon (phenomenon in which the metamerism is not satisfied) occurs as long as the human eye and the sensor of the scanner have different spectral sensitivities from each other. In the present specification, the phenomenon in which the metamerism is not satisfied is defined as the "color-unmatch".

As a method for preventing the color-unmatch which occurs when the metamerism is not satisfied, there is an image processing method disclosed in Japanese Unexamined Patent Publication No. 2002-94814 (Tokukai 2002-94814, published on Mar. 29, 2002). According to the image processing method of Tokukai 2002-94814, an original is read under at least two types of reading conditions. Then, it is judged whether or not target pixels, which have been judged to have a predetermined color under one of the reading conditions (first reading), change to another predetermined color when reading with respect to the target pixels under the other reading condition (second reading).

The number of pixels that turned to the above another predetermined color during the second reading is counted and compared with a value. An identification of a type of the original is made in accordance with the result thus compared (whether the original is of photographic, electrophotographic, or inkjet). Then, a color correction coefficient is set in accordance with a determination result regarding the original. Note that the two different reading conditions of the first and second readings are realized by (1) using scanners respectively having different CCD characteristics, (2) using or not using an infrared cut filter, or (3) switching light sources, or the like.

Another technique for preventing the color-unmatch which occurs when the metamerism is not satisfied, may be contrived. In such another technique, the spectral reflectance is measured or estimated. This kind of technique is disclosed in, for example, Japanese Unexamined Patent Publication No. 2001-86354 (Tokukai 2001-86354, published on Mar. 30, 2001). According to the technique for estimating the spectral reflectance, a multiband camera, which takes a picture, for example, through eight filters respectively having different transmission wavelength bands, is used to shoot an object so as to acquire a plurality of spectral images respectively indicating color information of the object for each wavelength. Then, the spectral reflectance of the object is estimated in accordance with the spectral images. An image, which is recognized as an image which picture is taken under a desired light source, is acquired in accordance with the estimated spectral reflectance. With this technique, it is possible to acquire a high-accurate image without damaging the color reproducibility of the object, even if a picture of the object having many colors, such as a painting, is taken.

Further, with the technique disclosed in Tokukai 2001-86354, even if an image forming medium contains a material that actively emits light energy upon receipt of the irradiation of light such as fluorescence, it is possible to acquire an image that is recognized as the one similar to a case where a picture is taken under a desired light source.

However, with the technique of Tokukai 2002-94814, it is only possible to reduce the color-unmatch with respect only to specific types of originals that use specific color materials. Namely, in the technique of Tokukai 2002-94814, the color material of the original is estimated, and then the color of the original is corrected in accordance with the type of the original, i.e., whether the original is of photographic, electrophotographic, or ink-jet. As such, with this technique, it is only possible to reduce the color-unmatch only in the case where the original is of photographic using a pre-set color material, electrophotographic, or inkjet. Thus, it is not possible to reduce the color-unmatch based on a color material other than the pre-set color material, and based on the factor other than the type of the original. Further, even in the case of the pre-set color material and the type of the original, it is not possible to correctly recognize whether or not the color-unmatch occurs if the original does not have a predetermined color.

As described above, the technique disclosed in Tokukai 2002-94814 can carry out a color correction with respect only to specified color materials. This is due to the fact that the input is 3-band input that differs from visual perception characteristics. In other words, because the color-unmatch is reduced with respect to specific color materials while the 3-band input is not processed, the technique of Tokukai 2002-94814 requires the judgment as to whether a color material is the specified one. Thus, it is possible to suppress the color-unmatch with respect only to the limited type of color materials, thereby causing a problem of lowering the accuracy of the color correction.

Further, the color-unmatch is not liable to occur in the method for estimating the spectral reflectance using the multiband camera (CCD) as disclosed in Tokukai 2001-86354. But, calculated amount for estimating the spectral reflectance becomes large. This causes the problem of requiring the image processing device to have higher performance, thereby remarkably increasing the price of the image processing device.

SUMMARY OF THE INVENTION

The present invention has an objective to provide an image processing method and image processing device capable of preventing a color-unmatch inexpensively and with high accuracy so as to highly improve the image quality.

In order to achieve the object, an image processing device of the present invention, in which a plurality of image data obtained by reading an original under a plurality of different reading conditions is used as a set of input image data, includes a data converting section for correcting the set of input image data based on the plurality of image data contained therein, so as to prevent a color-unmatch in output image data.

Conventionally (Tokukai 2002-94814), the presence or absence of a color-unmatch has been determined by reading an original under different conditions. However, these image data of the original are individually used in the correction for suppressing the color-unmatch, when it is present.

On the other hand, with the foregoing arrangement, the correction of image data is performed in accordance with a plurality of image data read under a plurality of different conditions. Therefore, it is possible to perform the conversion more accurately (without causing a color-unmatch), as compared with the case where the image data with a (possible) color-unmatch are individually used for the conversion. The image quality of the output image will never deteriorate due to the color-unmatch.

In order to achieve the foregoing object, another image processing device of the present invention, in which a plurality of image data obtained by reading an original under a plurality of different reading conditions is used as a set of input image data, includes a data converting section for selecting specific image data from the set of input image data and correcting the set of input image data based on the selected image data, so as to prevent a color-unmatch in output image data.

With this arrangement, the correction of image data for preventing a color-unmatch is performed based on a plurality of image data read under a plurality of different conditions. Thus, it is possible to carry out the conversion more accurately, as compared with the case where the image data with a color-unmatch are individually used for the conversion.

The data converting section selects specific image data from the set of input image data, and corrects the image data based on the selected image data, so as to prevent a color-unmatch. In this way, it is possible to reduce calculated amount involved in the correction, as compared with the case where all of the image data in the set of input image data are used for the computation.

For a fuller understanding of the nature and advantages of the invention, reference should be made to the ensuing detailed description taken in conjunction with the accompanying drawings.

DESCRIPTION OF THE EMBODIMENTS

The following will explain an embodiment of the present invention with reference to the drawings.

Figure 2:
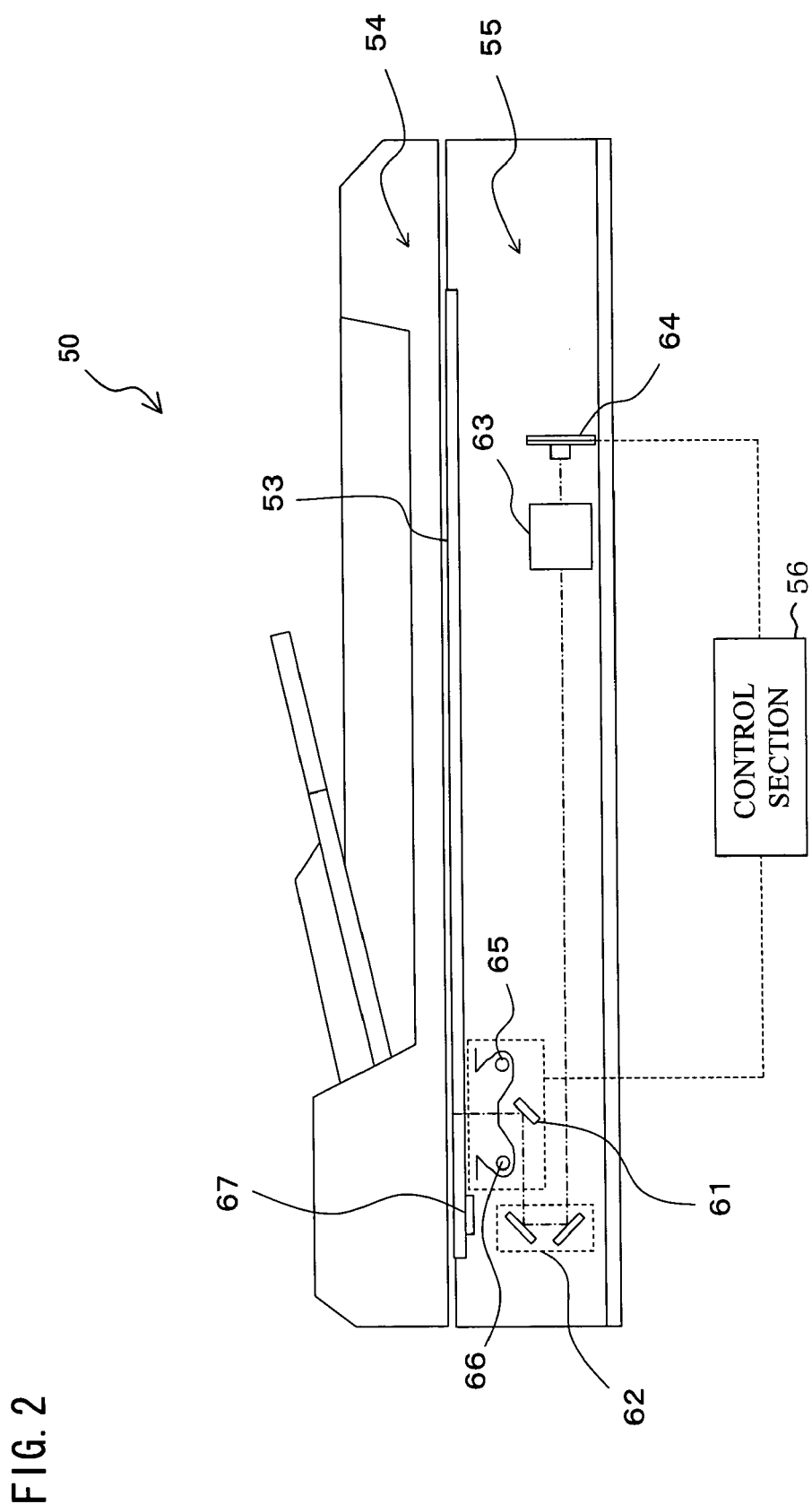
FIG. 2 is a cross-sectional view schematically showing how the image reading device is arranged.

First, with reference to FIGS. 2 and 3, a scanner (flatbed scanner) 50 which is an image reading device will be explained.

Figure 3:
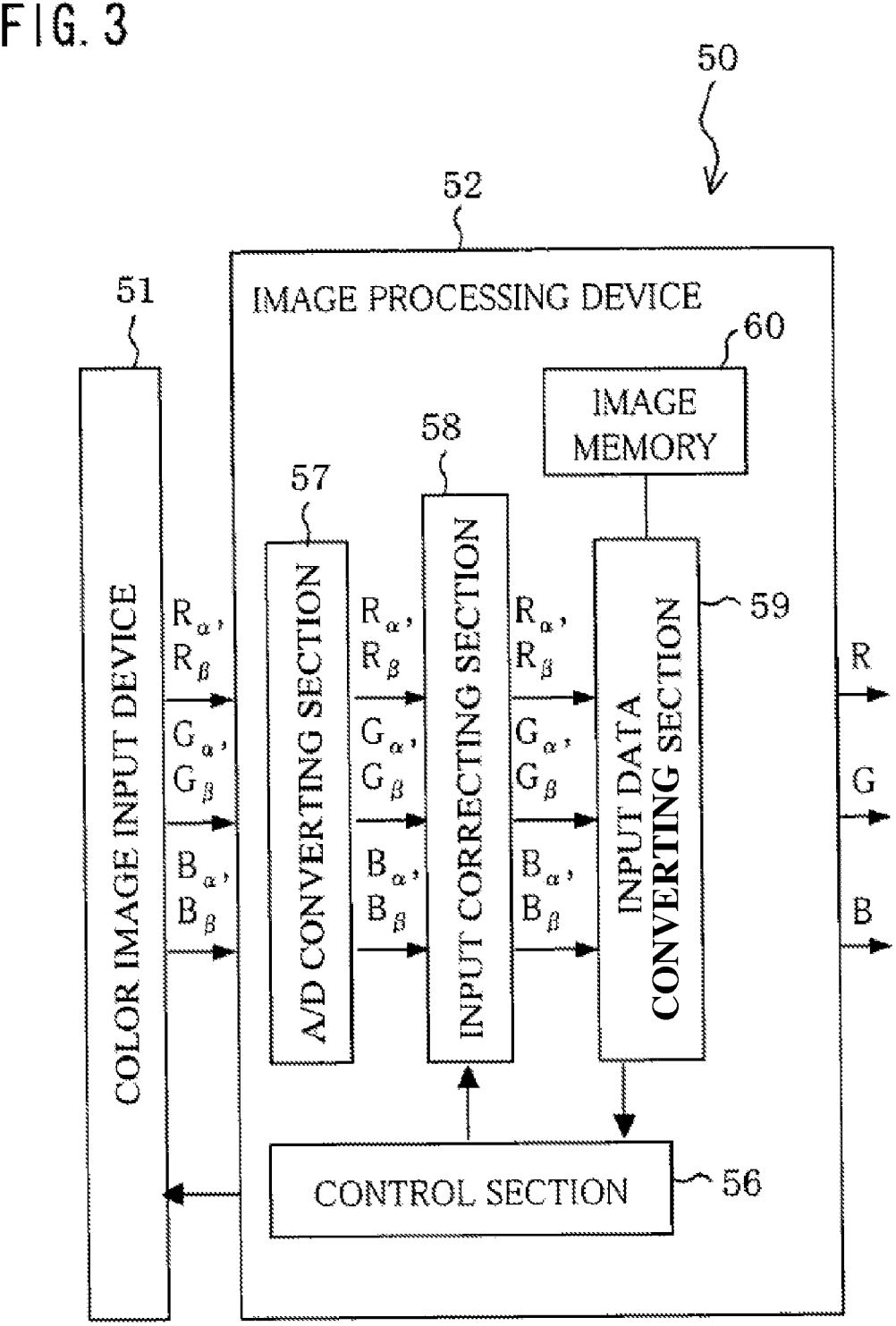
FIG. 3 is a block diagram schematically showing how the image reading device is arranged.

As shown in FIG. 3, the scanner 50 includes a color image input device 51 and an image processing device 52. As shown in FIG. 2, the color image input device 51 includes a document table 53, a reversing automatic document feeder (RADF) 54, and an image input device 55. As shown in FIG. 3, the image processing device 52 includes a control section 56, an A/D (analog/digital) converting section 57, an input correcting section 58, an input data converting section 59, and an image memory 60.

On a top surface of the document table 53 of the color image input device 51, the reversing automatic document feeder 54 is provided so as to be supported to be openable and closable with respect to the document table 53, and so as to maintain a predetermined positional relationship with respect to the surface of the document table 53.

Further, the reversing automatic document feeder 54 feeds an original so that one surface of the original faces the image input device 55 in a predetermined position on the document table 53. After an image on the above one surface is read, the reversing automatic document feeder 54 reverses the original and feeds the original toward the document table 53 so that the other surface of the original faces the image input device 55 in the predetermined position on the document table 53. After the images on both sides of the original are read, the reversing automatic document feeder 54 discharges the original, and then performs another reversing and feeding operations with respect to a next original. The feeding and reversing operations with respect to the original are controlled in association with the entire operation of the scanner 50.

The image input device 55 is provided below the document table 53. This permits reading of (i) an image on an original fed onto the document table 53 by the reversing automatic document feeder 54 or (ii) an image on an original placed on the document table 53 by the user. The image input device 55 includes two original scanning bodies, namely a first scanning unit 61 and a second scanning unit 62, which move back and forth in parallel with an under surface of the document table 53; an optical lens 63; and a CCD (Charge Coupled Device) line sensor 64 which is a photoelectric converting element.

The first scanning unit 61 includes light sources (exposing lamps) 65 and 66, having different spectral distributions from each other, which are light sources for exposing a surface of the original on which the image is formed; and a first mirror which deflects, in a predetermined direction, an image of the light reflected by the original. The first scanning unit 61 moves back and forth in parallel at a predetermined scanning speed while maintaining a predetermined distance from the under surface of the document table 53. The second scanning unit 62 includes second and third mirrors which further deflect, in a predetermined direction, the image of the light reflected by the original and further deflected by the first mirror of the first scanning unit 61. The second scanning unit 62 moves back and forth in parallel while maintaining a constant speed relationship with the first scanning unit 61.

The optical lens 63 reduces the image of the light which is reflected by the original and is deflected by the third mirror of the second scanning unit 62. The optical lens 63 forms the image of the light thus reduced in a predetermined position on the CCD line sensor 64.

The CCD line sensor 64 sequentially carries out photoelectric conversion with respect to the images of the light thus formed, and outputs them as electric signals, respectively. The CCD line sensor 64 is a 3-line color CCD capable of reading a monochrome image or a color image so as to output line data which is obtained by separating the image into R (red), G (green), and B (blue) color components, respectively. The image information of the original, which is converted into the electric signal by the CCD line sensor 64, is sent to the image processing device 52 so as to be subject to a predetermined image data processing.

The light sources 65 and 66 have different spectral distributions from each other. For example, the light source 65 is a halogen lamp, and the light source 66 is a fluorescent lamp. Note that, the light sources 65 and 66 are not limited to the halogen lamp and the fluorescent lamp, respectively, and may be a xenon lamp, a metal halide lamp, or the like. The operations of the light sources 65 and 66 are respectively controlled by the control section 56 of the image processing device 52.

Note that, the foregoing description deals with a case where the image reading device includes the reversing automatic document feeder 54, but the present invention is not limited to this. Alternatively, the image reading device may be arranged so as to include an automatic document feeder (ADF), or so as to include only a document table cover without any document feeder, or so as to include a device for simultaneously reading both sides of an original, which includes (i) an original reading system composed of the two original scanning bodies, the optical lens 63, and the CCD (Charge Coupled Device) line sensor 64, and (ii) a reading system composed of a contact image sensor.

In the color image input device 51 as arranged above, the CCD line sensor 64 reads the images of the light reflected from the original, which are obtained by the exposure of the respective light sources 65 and 66, as analog signals $R_\alpha$, $G_\alpha$, $B_\alpha$ and analog signals $R_\beta$, $G_\beta$, $B_\beta$, respectively ($R_\alpha$ and $R_\beta$: red, $G_\alpha$ and $G_\beta$: green, and $B_\alpha$ and $B_\beta$: blue). Then, the color image input device 51 supplies the analog signals to the image processing device 52.

The analog signals read by the color image input device 51 are sent to the A/D converting section 57, the input correcting section 58, and the input data converting section 59 sequentially in this order in the image processing device 52 (see FIG. 3). The signals of the input data converting section 59 are then outputted to a personal computer, etc., as digital color signals in a reference color space (RGB defined in the image processing device, for example; the details will be described later).

The A/D converting section 57 converts the analog signals $R_\alpha G_\alpha B_\alpha$ and $R_\beta G_\beta B_\beta$ into digital signals, respectively.

The input correcting section 58 carries out corrections, such as shading correction, gamma correction, line delay correction, and MTF (Modulation Transfer Function) correction, with respect to the digital signals $R_\alpha G_\alpha B_\alpha$ and $R_\beta G_\beta B_\beta$ sent from the A/D converting section 57. On this account, the input correcting section 58 includes a shading correcting section 58A, a gamma correcting section 58B, a line delay correcting section 58C, and an MTF correcting section 58D (see FIG. 4).

The shading correcting section 58A carries out processing with respect to the digital signals RGB received from the A/D converting section 57 so as to eliminate various kinds of distortions arising from an illuminating system, image forming system, and image pickup system of the color image input device 51.

The gamma correcting section 58B converts the digital signals RGB, which vary in proportion to brightness, into density signals, respectively. The gamma correcting section 58B corrects the density signals, which are read using a gamma curve that varies in accordance with the light source.

The line delay correcting section 58C eliminates line gaps between the digital signals RGB of the CCD line sensor 64, so that no line gaps is contained. More specifically, the displacement of the CCD line sensor 64, which includes R, G, and B filters, is corrected by the line delay correcting section 58C.

The MTF correcting section 58D corrects deteriorated MTF (Modulation Transfer Function) of an image signal that is outputted from the CCD line sensor 64. Namely, the MTF (Modulation Transfer Function) of the image signal outputted from the CCD line sensor 64 is deteriorated due to factors such as an aperture of the light-receiving surfaces of the CCD line sensor 64, an optical component including a lens and a mirror, transmission efficiency, afterimage, integration effect caused by physical scanning, or uneven scanning. Thus, the scanned original image information is blurred. As such, the MTF correcting section carries out appropriate filtering (enhancing) with respect to the image information of the original thus scanned, so as to repair the blur and improve the image quality.

The input data converting section 59 shown in FIG. 3 judges whether a color-unmatch occurs on the image which is scanned and read. When the input data converting section 59 judges that the color-unmatch occurs, the input data converting section 59 converts the signals $R_\alpha G_\alpha B_\alpha$ and $R_\beta G_\beta B_\beta$, from which various kinds of distortions have been eliminated by the input correcting section 58, into signals in a reference color space (L*a*b* signals or sRGB signals) or into color signals defined within the image processing device 52 (RGB signals, CMY (K) signals, etc.). The signals (RGB signals in FIG. 3) thus converted are outputted to a personal computer, and the like.

The image memory 60 stores various data (input conversion tables, LUTs, conversion equations, for example) required for later described data conversion in the input data converting section 59.

The image data, which has been subject to the processings as described above, is supplied to a computer and/or a printer. Note that, the above-described each processing is controlled by a CPU (Central Processing Unit) which is served as the control section 56. Specifically, the CPU (control section) controls the respective operations of the color image input device 51 and image processing device 52.

Figure 1:
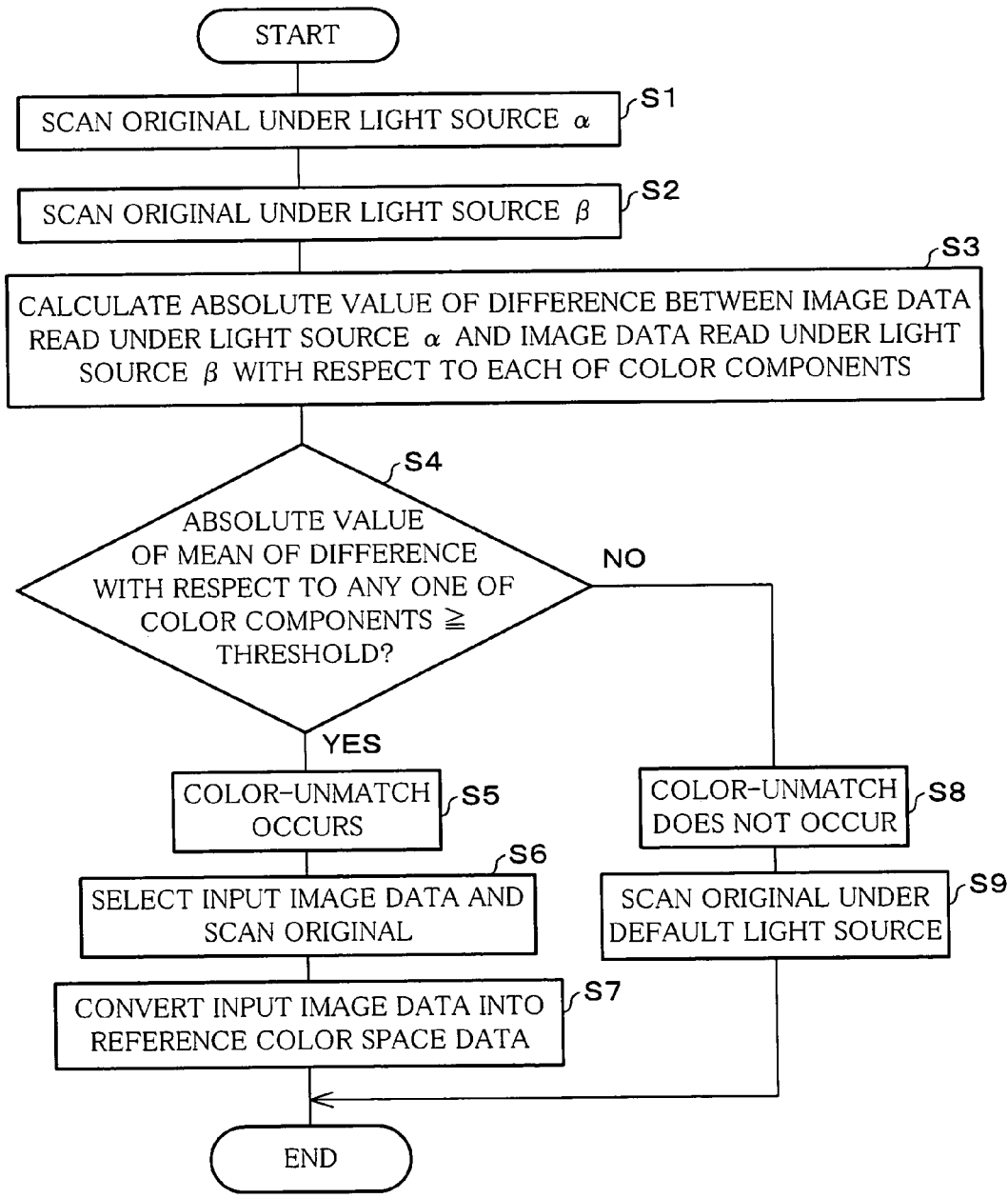
FIG. 1 shows an embodiment of the present invention, and is a flowchart showing how an image reading device operates to which image processing of the present invention is applied.

With reference to the flowchart shown in FIG. 1, the following will explain the operation in which an image is read by the scanner 50 as arranged above, and is converted into image data in a reference color space. In the present embodiment, the image is converted into the signals in the reference color space with the use of RGB signals which are obtained by using the two light sources 65 and 66 that have different spectral distributions from each other. In other words, in order to prevent the deterioration of the image quality due to the occurrence of color-unmatch, the color conversion is performed based on the RGB signals that are read using the light sources 65 and 66.

When receiving a request for reading out an original, the scanner 50 carries out (1) a white balance (white level) adjustment, and (2) a gamma adjustment. This results in that reference data read out under the light source 65 is identical to that read out under the light source 66. In the present embodiment, a reference white plate 67 provided on the under surface of the document table 53, as shown in FIG. 2, is used as the reference data.

Figure 4:
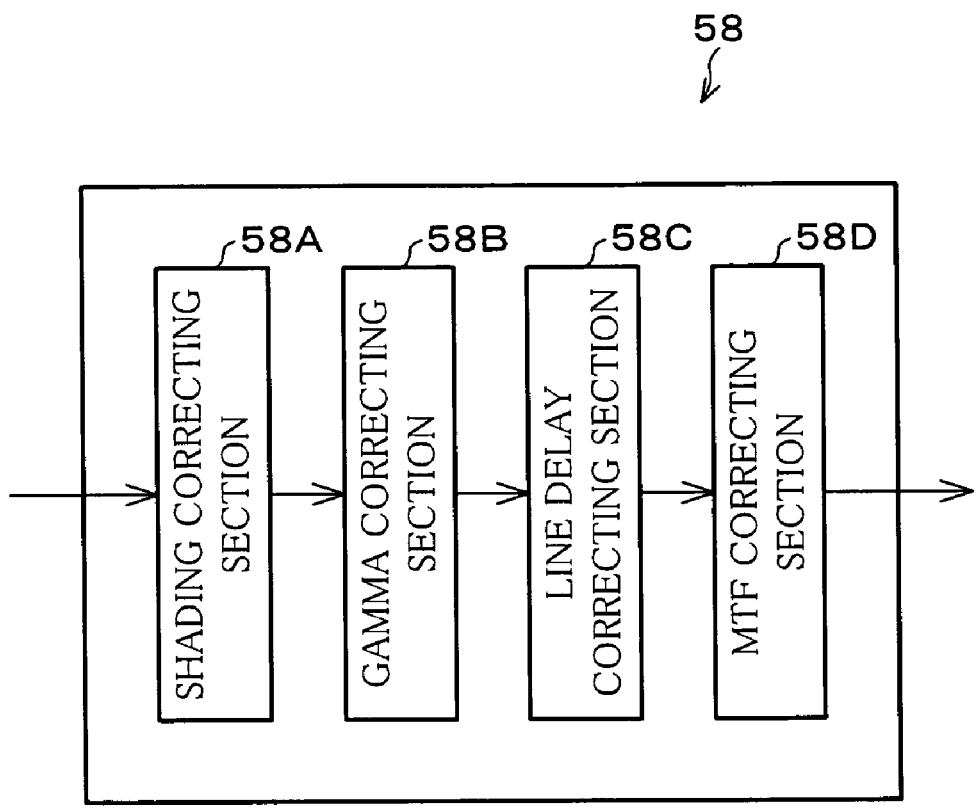
FIG. 4 is a block diagram showing how an input correcting section of an image processing device in the image reading device is arranged.

Namely, the reference white plate 67 is illuminated by each of the light sources 65 and 66, and a digital signal RGB, obtained by reading light reflected from the reference white plate 67, is set to a reference value of the shading correcting section 58A shown in FIG. 4. Specifically, the RGB signal, obtained by reading the light reflected from the reference white plate 67 after the illumination of the respective light sources 65 and 66, is set to 255 in 256-gradation display, for example. This allows the balance of the RGB signal (hereinafter referred to as white level) to be adjusted. Then, an RGB signal, obtained by scanning an original, is specified as a value corresponding to the reference value that is set as the white level. The RGB signal obtained by scanning the original is converted into a density signal by the gamma correcting section 58B.

Further, after the white balance is adjusted as described above, the gamma adjustment is performed. Specifically, the light sources 65 and 66 illuminate a reference chart such as a gray gradation, and the gamma curve is corrected to have the reference value as specified above. In other words, the gamma curve is corrected so that the signal level (density signal), obtained by the illumination of the light source 65 with respect to the reference chart, is identical to that by the illumination of the light source 66. The gamma curves thus corrected are stored in the gamma correcting section 58B for the respective light sources 65 and 66. The control section 56 sets the gamma curve, to be used to correct the density signals of the original, in accordance with the respective light sources 65 and 66.

The foregoing white balance (white level) adjustment and the gamma adjustment permit the reduction of variation in the readings, caused by unevenness of the light sources 65 and 66, difference in sensitivity of the CCD line sensor 64, or other reason. As such, the reading of the reference white plate 67 is identical to the reading of the reference chart, under the light sources 65 and 66. The correction may be made with the use of an IT8 (standards regarding color index of scanners, which are discussed and standardized by a technical committee of ANSI (American National Standard Institute)) chart as the reference chart, for example.

Next, an original is scanned using the light source 65 in S1 shown in FIG. 1, and is then scanned using the light source 66 in S2. Here, it is assumed that an RGB signal obtained by the scanning of the original under the light source 65 is indicated by $(R_\alpha, G_\alpha, B_\alpha)$, and an RGB signal obtained by the scanning of the original under the light source 66 is indicated by $(R_\beta, G_\beta, B_\beta)$. Note that, hereinafter the light source 65 is referred to as a light source $\alpha$, and the light source 66 is referred to as a light source $\beta$.

As described above, the two light sources $\alpha$ and $\beta$ having different spectral distributions from each other are used here, and thus the original should be read (scanned) at least twice. Consequently, a pre-scanning, which can be performed more easily and in a shorter time as compared to the main scanning, can be performed during the reading of the original. With this pre-scanning, it is possible to judge in advance whether or not the color-unmatch occurs, thereby reducing the number of the main scannings to be carried out with respect to the original. As such, the scannings of the original in S1 and S2 may be respectively performed in a pre-scanning mode.

Then, the control section 56 selects as the signal to be used for the color conversions, (i) at least one signal from the $(R_\alpha, G_\alpha, B_\alpha)$ signals that are read using the light source $\alpha$, and (ii) at least one signal from the $(R_\beta, G_\beta, B_\beta)$ signals that are read using the light source $\beta$. If the number of the selected signals is larger, then it is possible to realize the color conversion with higher accuracy. But, the size of the conversion table (later described) becomes larger. On this account, instead of all of the six signals ($(R_\alpha, G_\alpha, B_\alpha)$ and $(R_\beta, G_\beta, B_\beta)$ signals), only signals that are apt to cause a color-unmatch may be selected in order to perform the correction in accordance with the characteristics of the CCD line sensor 64. This permits reducing the size of the conversion table.

For example, the following will explain a case where, among the RGB signals, the $(R_\alpha, G_\alpha, B_\alpha)$ signals read under the light source $\alpha$ and the $(R_\beta)$ signal read under the light source $\beta$ are used as the signals that are apt to cause a color-unmatch. When the four signals (four signals $R_\alpha, G_\alpha, B_\alpha, R_\beta$) are used in the following cases, it is possible to appropriately perform the color conversion and to reduce the color-unmatch.

Specifically, when the CCD line sensor 64 has characteristics in which infrared is additionally read through the R filter, the CCD line sensor 64 may read objects to be more reddish than actual (more reddish than perceived by the human). In such a case, if an original, having a color material which reflects the infrared, is read using only the light source $\alpha$ (halogen lamp), the original is read to be more reddish. On the other hand, if the original is read under the light source $\beta$ (fluorescent lamp) which does not contain much infrared, then the original can be read to have a reading value close to an ideal value (redness perceived by the human eye). On this account, it is possible to perform the conversion which suppresses the redness, by using the four signals read under the different light sources, and by performing the correction processing in accordance with the characteristics of the CCD line sensor 64.

For example, it is assumed that an ideal reading value of an RGB signal with respect to an original whose color is neutral gray (L*=50, a*=b*=0 in the L*a*b* color system) is, for example, (128, 128, 128); (150, 128, 128) under the light source α; and (135, 135, 135) under the light source β. In this case, it is possible to perform the conversion that suppresses the redness, by using the reading values ($R_\alpha$, $G_\alpha$, $B_\alpha$) under the light source α, and the reading value ($R_\beta$) under the light source β.

Note that, the foregoing described the case where the reading of the original was carried out while the light sources α and β were separately lighted in S1 and S2. It depends on the type of the light source α or β, however, there are some cases where the quantity of light of the light sources α or β is not sufficient for the reading by the CCD line sensor 64. In such cases, in order to make up for the deficiency of the quantity of light, the original may be read while the light sources α and β are simultaneously lighted (this state is dealt with as a provisional light source β'). In other words, an RGB signal read using the light source α and an RGB signal read using the light source β' (namely, the simultaneous lighting of the light sources α and β) may be used. With this, it is possible to achieve effects similar to those achieved in the cases where the light sources α and β are separately lighted. Note that, a difference in the quantity of light may be corrected by the foregoing white balance adjustment.

The simultaneous lighting of the light sources α and β as described above is profitable in cases where a xenon lamp (whose spectral spectrum is close to that of a fluorescent lamp) and a halogen lamp (incandescent lamp) are used as the light sources. Namely, if the xenon lamp is used as the light source, the sufficient quantity of light is secured, but the coloring characteristics are not stable. On the other hand, if the halogen lamp is used as the light source, the coloring characteristics are stable, but the quantity of light may be insufficient. On this account, the xenon lamp is used as the light source α and the halogen lamp is used as the light source β here, and the original is read using the light source α and using the simultaneously lighted light sources α and β (light source β'). With this, it is possible to solve the problem that the quantity of light from the light source β is insufficient.

Next, in order to judge whether or not a color-unmatch occurs, a mean value of difference values between (i) the $R_\alpha$ signal (data) read using the light source α and (ii) the $R_\beta$ signal (data) read using the light source β, among the RGB signals read in S1 and S2, is calculated in S3 in accordance with the following expression.

$$\sum_{i=1}^{N} |R_{\alpha,i} - R_{\beta,i}|/N$$

(N: total number of pixels of a pre-scanned image)

Here, the $R_\alpha$ signal and the $R_\beta$ signal are used in the expression for calculating the difference value, but the signals may be any same color component signals that are obtained from different light sources. Note that, the difference value is used in the present embodiment, but a mean square error may be used instead.

Next, the absolute value of the mean value of the difference value (hereinafter referred to as mean difference value) is compared to a pre-set threshold value T in S4. If the mean difference value is not less than the threshold value, it is judged that the color-unmatch occurs, and then the processing proceeds to S5. Note that, the threshold value T is a value which is determined by the characteristics of the CCD line sensor 64 and the light sources α and β. Generally, the threshold value T falls within about 10 to 50. Note that, if all of the components read under the light sources α and β are used to judge the occurrence of the color-unmatch, the mean value of differences with respect to all of the components is used for the judgment. On the other hand, if the mean difference value is lower than the threshold value in S4, it is judged that no color-unmatch occurs, and then the processing proceeds to S8.

The judgment as to whether or not the color-unmatch occurs as described above may be carried out automatically during the pre-scanning. Alternatively, a high image quality mode, for example, is set as a mode for the image processing, and the occurrence of the color-unmatch may be judged in a case where software performs image processing on a computer or where the high image quality mode is selected on an operation panel in an image forming device or in an image reading device.

When it is judged that no color-unmatch occurs, the processing proceeds from S8 to S9. Here, the original is scanned using the light source which is set as a default light source. An RGB signal obtained by this scanning is outputted after it is processed by the A/D converting section 57 and the input correcting section 58, respectively. In this case, the input data converting section 59 is not required to perform the processing for correcting the color-unmatch, and thus the processing at the input data converting section 59 is through (no processing).

On the other hand, if the color-unmatch occurs (S5), the processing proceeds to S6. Here, the main scanning is carried out with respect to the original using the respective light sources α and β. Then, (i) at least one of the reading values ($R_\alpha$, $G_\alpha$, $B_\alpha$) under the light source α, and (ii) at least one of the reading values ($R_\beta$, $G_\beta$, $B_\beta$) under the light source β, to which the main scannings are carried out in S6 and which are processed by the A/D processing section 57 and the input correcting section 58, are used for the conversion into data (signal) in a reference color space (S7).

In other words, in S7, the RGB signal read by the main scanning is processed by the A/D processing section 57 and the input correcting section 58, and is then converted by the input data converting section 59 into reference data in a color space such as an sRGB signal and an L*a*b* signal, or a signal defined in the image processing device 52 (hereinafter collectively referred to as reference signal). These signals are signals having device-independent absolute values. The L*a*b* signal is CIE1976L*a*b* signal (CIE: Commission Internationale de l'Eclairage, L*: lightness, and a* and b*: chromaticity).

The method by which the input data converting section 59 converts the RGB signal into the reference signal is not limited to a specific one. Alternatively, methods (1) to (4) as described below may be adopted, for example. The following will explain these methods.

(1) Case Where the ($R_\alpha$, $G_\alpha$, $B_\alpha$) Signals and the ($R_\beta$) Signal are Used First, in order to prepare the input conversion tables, color patches made of various color materials are respectively scanned under each of the light source α and the light source β. Next, the color patches are made into numeric values using the reference signal. In this processing, the colors of the color patches are measured so that the reference signals (L*a*b* signals here) are obtained. Hereinafter, the numeric values thus obtained are measured values.

Next, an arbitrary reading value ($r_{1i}, g_{1i}, b_{1i}, r_{2i}$) of the color patch is associated with its corresponding reference signal ($L_i, A_i, B_i$). In this manner, values of a table having a size of 17×17×17×17 are calculated, and the input conversion table is prepared. This calculation may be carried out using linear interpolation operation, neural network, or the like.

The table values stored in the input conversion table thus obtained are used for carrying out the data conversion. Specifically, high 4-bit signal of an input signal P ($r_1, g_1, b_1, r_2$) supplied to the input data converting section 59 is indicated by ($r_{1u}, g_{1u}, b_{1u}, r_{2u}$), and low 4-bit signal of the input signal P is indicated by ($r_{11}, g_{11}, b_{11}, r_{21}$). Then, a total of 16 tables, namely, a table value $L_0$ ($r_{1u}, g_{1u}, b_{1u}, r_{2u}$) corresponding to the high bit signal, $L_1$ ($r_{1u}, g_{1u}, b_{1u}, r_{2u}+1$), ..., $L_{15}$ ($r_{1u}+1, g_{1u}+1, b_{1u}+1, r_{2u}+1$) are read out, respectively.

Note that, interpolation table values of the 16 tables are expressed by the following expression:

$$\sum_{i=0}^{15} Vi \cdot Li/2^{16}$$

Here, Vi is a weighing factor indicating the volume of a solid located diagonally in a four-dimensional space formed with the 16 tables when the four-dimensional space is divided by the input signal P. For example, $V1=(16-r_{11})(16-g_{11})(16-b_{11})r_{21}$.

As described above, the ($R_\alpha, G_\alpha, B_\alpha$) and ($R_\beta$) signals, which are the reading values under the light sources $\alpha$ and $\beta$, are converted into the reference signal (L*a*b* signal) in accordance with the pre-set table values and the interpolation operation. Note that, the foregoing description deals with the case where the ($R_\alpha, G_\alpha, B_\alpha, R_\beta$) signals are used for the data conversion. The present invention is not limited to this. Alternatively, a calculation similar to that as described above can be also used for a data conversion in cases where five or six signals (the four signals plus the ($R_\beta$) and ($G_\beta$) signals) may be used for the data conversion.

If the number of the signals used in the conversion increases as described above, then the conversion accuracy improves, whereas the size of the conversion table becomes large. For example, if four signals are used, then the size of the conversion table required for the interpolation operation is $9^4 \approx 6.5$ kilobyte (when the spacing between the lattices is 32). On the other hand, if six signals are used, then the size of the conversion table is $9_6 \approx 520$ kilobyte.

(2) Case Where a Difference is Used

The reading value ($r_1, g_1, b_1$) under the light source $\alpha$, and a difference value ($r_1-r_2$) between the reading value of the R signal under the light sources a and the reading value of the R signal under the light source $\beta$ are set to input values. The input values are converted into a reference signal in a similar manner to the case (1). The difference value between the reading values is used here because the difference in the reading values between the light sources $\alpha$ and $\beta$ is generally not so large, if any. Thus, it is possible to suppress the size of the table, by including the difference value in the input values. For example, if a range of the difference values is ±32 (lattice points: −32, −16, 0, +16 and +32 (five tables)), then it is possible for the table to have a total size of 17×17×17×5.

(3) Case Where a Correction LUT (Lookup Table) with Respect to a Difference is Used The color correction under the light source $\alpha$, and the correction using the difference in the reading values between the light sources $\alpha$ and $\beta$ are performed for a data conversion. A method for the data conversion is not limited to a specific one. For example, the data conversion may be made with the use of matrix operation. Note that, the following will explain a case where the data conversion is carried out on the basis of a color correction under the light source $\alpha$. Alternatively, the data conversion may be similarly carried out on the basis of the color correction under the light source $\beta$.

Figure 6:
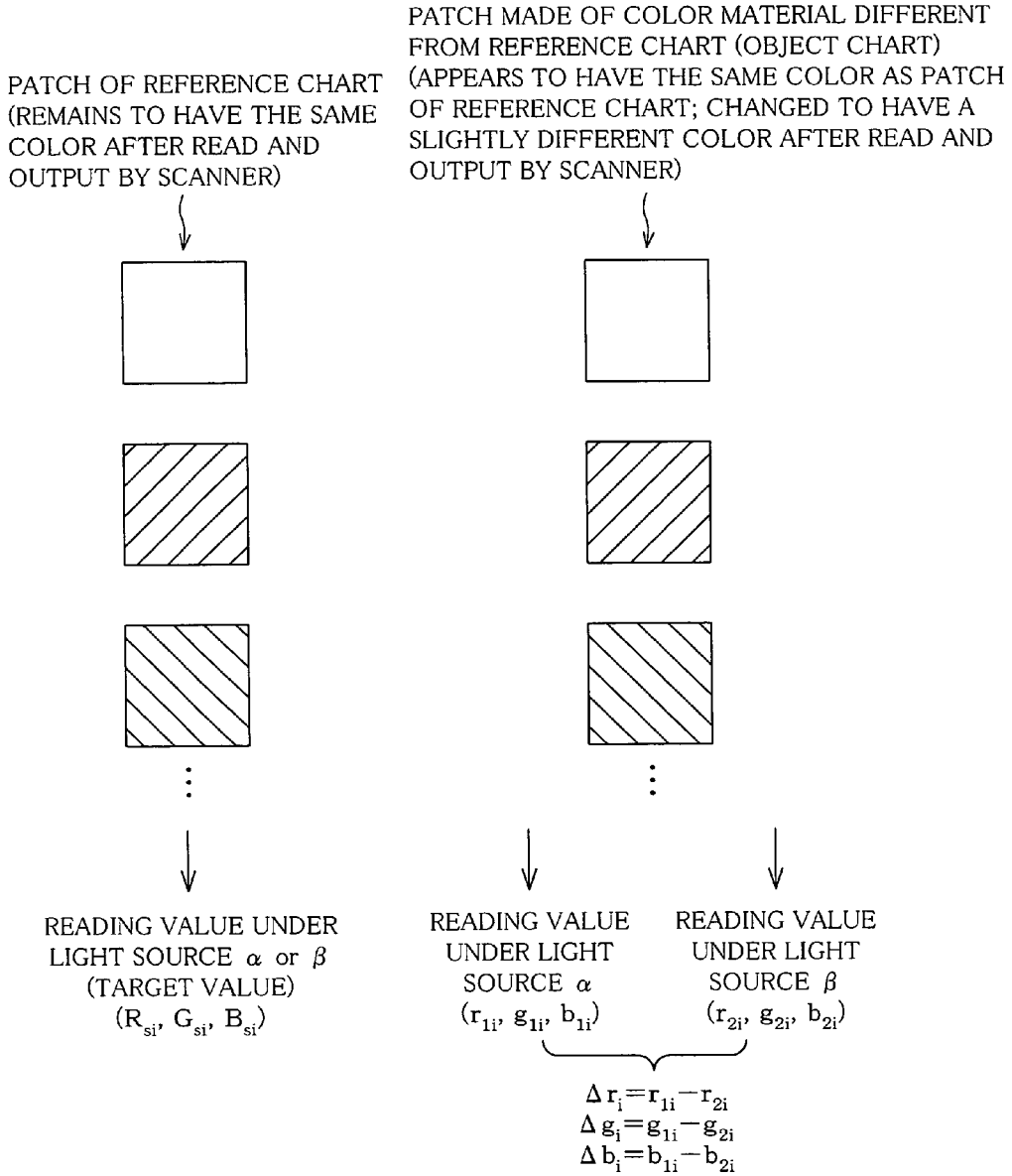
FIG. 6 is a diagram showing an example of correction processing in accordance with the present invention.

Matrix factors are calculated so that the data conversion is carried out with the use of the matrix. Specifically, a patch of a reference chart, and a patch having a color material different from the reference chart (hereinafter referred to as object chart) are prepared (see FIG. 6). Here, the object chart means as follows. Namely, the human eye cannot discern, in terms of color, between the object chart and the reference chart, whereas a reading value obtained when a scanner reads out the object chart is different from that obtained when the scanner reads out the reference chart. Next, the reference chart and the object chart are read out under the respective light sources $\alpha$ and $\beta$.

It is assumed that a reading value of the reference chart under the light source $\alpha$ or $\beta$ is indicated by ($R_{si}, G_{si}, B_{si}$), and a difference in the reading values of the object chart between the light sources $\alpha$ and $\beta$ is indicated by ($\Delta r_i, \Delta g_i, \Delta b_i$). More specifically, when it is assumed that (i) a reading value of the object chart under the light source $\alpha$ is indicated by ($r_{1i}, g_{1i}, b_{1i}$), and (ii) a reading value of the object chart under the light source $\beta$ is indicated by ($r_{2i}, g_{2i}, b_{2i}$), the difference in the reading values ($\Delta r_i, \Delta g_i, \Delta b_i$) is expressed by the following expressions.

$$\Delta r_i = r_{1i} - r_{2i}$$

$$\Delta g_i = g_{1i} - g_{2i}$$

$$\Delta b_i = b_{1i} - b_{2i}$$

These values are substituted to the following expression, and the matrix factors are calculated by multiple-regression analysis, etc.

$$\begin{pmatrix} R_{si} \\ G_{si} \\ B_{si} \end{pmatrix} = \begin{pmatrix} r_{1i} \\ g_{1i} \\ b_{1i} \end{pmatrix} + \begin{pmatrix} a_{03} & a_{04} & a_{05} \\ a_{13} & a_{14} & a_{15} \\ a_{23} & a_{24} & a_{25} \end{pmatrix} \begin{pmatrix} \Delta r_i \\ \Delta g_i \\ \Delta b_i \end{pmatrix}$$

With the use of the matrix factors thus calculated, the reading value ($r_1, g_1, b_1$) under the light source $\alpha$ is converted into a corrected value ($R_0, G_0, B_0$) under the light source $\alpha$ in accordance with the following expression, where it is assumed that a reading value under the light source $\alpha$ is indicated by ($r_1, g_1, b_1$), and a difference in the reading values between the light sources $\alpha$ and $\beta$ is indicated by ($\Delta r, \Delta g, \Delta b$).

$$\begin{pmatrix} R_0 \\ G_0 \\ B_0 \end{pmatrix} = \begin{pmatrix} r_1 \\ g_1 \\ b_1 \end{pmatrix} + \begin{pmatrix} a_{03} & a_{04} & a_{05} \\ a_{13} & a_{14} & a_{15} \\ a_{23} & a_{24} & a_{25} \end{pmatrix} \begin{pmatrix} \Delta r \\ \Delta g \\ \Delta b \end{pmatrix}$$

With this method, a reading value is corrected to be the same as that of the reference chart, irrespective of difference in the color material. Namely, according to this method, a signal that is outputted after it is subject to the data conversion in the input data converting section 59 is not an L*a*b* signal, but a reference RGB signal, unlike in the methods of the cases (1) and (2).

(4) Case Where Only a Specific Color Component is Corrected

A data conversion is made by carrying out a correction with respect only to a specific color component (one of R, G, and B) among the RGB signals. Specifically, a reference chart and a object chart are prepared as explained in the case (3), and a data conversion is carried out by finding a conversion expression or a two-dimensional LUT with the only use of a specific color component (R signal here) among reading values of the charts.

Here, a method for finding the conversion expression with respect to the R signals will be explained. It is assumed that a reading value of the reference chart under the light source α is indicated by $R_{si}$, and reading values of the object chart under the light sources α and β are indicated by $R_{\alpha i}$ and $R_{\beta i}$, respectively. These values are substituted to the following expression, and $a_1$ through $a_3$ are determined by the least-squares method or other method in such a manner that an error in the conversion is minimized.

$$R_{si}=a_1 R_{\alpha i}+a_2 R_{\beta i}+a_3$$

With the use of the $a_1$ through $a_3$ thus determined, the reading values $R_\alpha$ and $R_\beta$ under the light sources a and β, respectively, are converted into a corrected value $R_0$ in accordance with the following conversion expression.

$$R_0=a_1 R_\alpha+a_2 R_\beta+a_3$$

Note that, the foregoing explained the case where the conversion expression was set so that the corrected value $R_0$ was calculated with the use of the reading values $R_\alpha$ and $R_\beta$ under the light sources α and β. The present invention is not limited to this. Alternatively, only $R_\alpha$ or a difference value $\Delta R(=R_\alpha - R_\beta)$ may be used.

A signal that is outputted after it is subject to the data conversion in the input data converting section 59 is a reference RGB signal as in the method of the case (3).

The foregoing explained the methods of the cases (1) through (4) for carrying out the data conversion of the input data converting section 59 from the RGB signal into the reference signal. The methods of the cases (1) through (4) for the data conversion are ranked in order of accuracy of the correction (conversion). The methods of the cases (1) through (4) for the data conversion are ranked in reverse order of calculated amount. On this account, one of the methods can be selected in accordance with desired accuracy and calculated amount.

The signal, which has been subjected to the data conversion in S7 shown in FIG. 1 (L*a*b* signal or reference RGB signal in the cases described above), is outputted from the image processing device 52 of the scanner 50 to a personal computer, etc.

Further, the flowchart shown in FIG. 1 shows as an example the processing in which it is judged in S3 and S4 whether the color-unmatch occurs, and, if it is judged that the color-unmatch occurs, then the correction processing (processing for converting input image data into the data in a reference color space) is carried out in S7. However, the present invention is not limited to this example, i.e., the processing for judging whether or not the color-unmatch occurs may be omitted.

For example, in the method of the case (1), if the input conversion table is prepared with respect to the input image data ($R_\alpha$, $G_\alpha$, $B_\alpha$, $R_\beta$) so as to include a case where $R\alpha=R\beta$ is satisfied (if $R_\alpha=R_\beta$ is satisfied, then the input image data is directly outputted, or is converted into image data in a reference color space, for example), then it is possible to carry out a conversion so that no color-unmatch occurs irrespective of the judgment as to whether or not the color-unmatch occurs.

Figure 5:
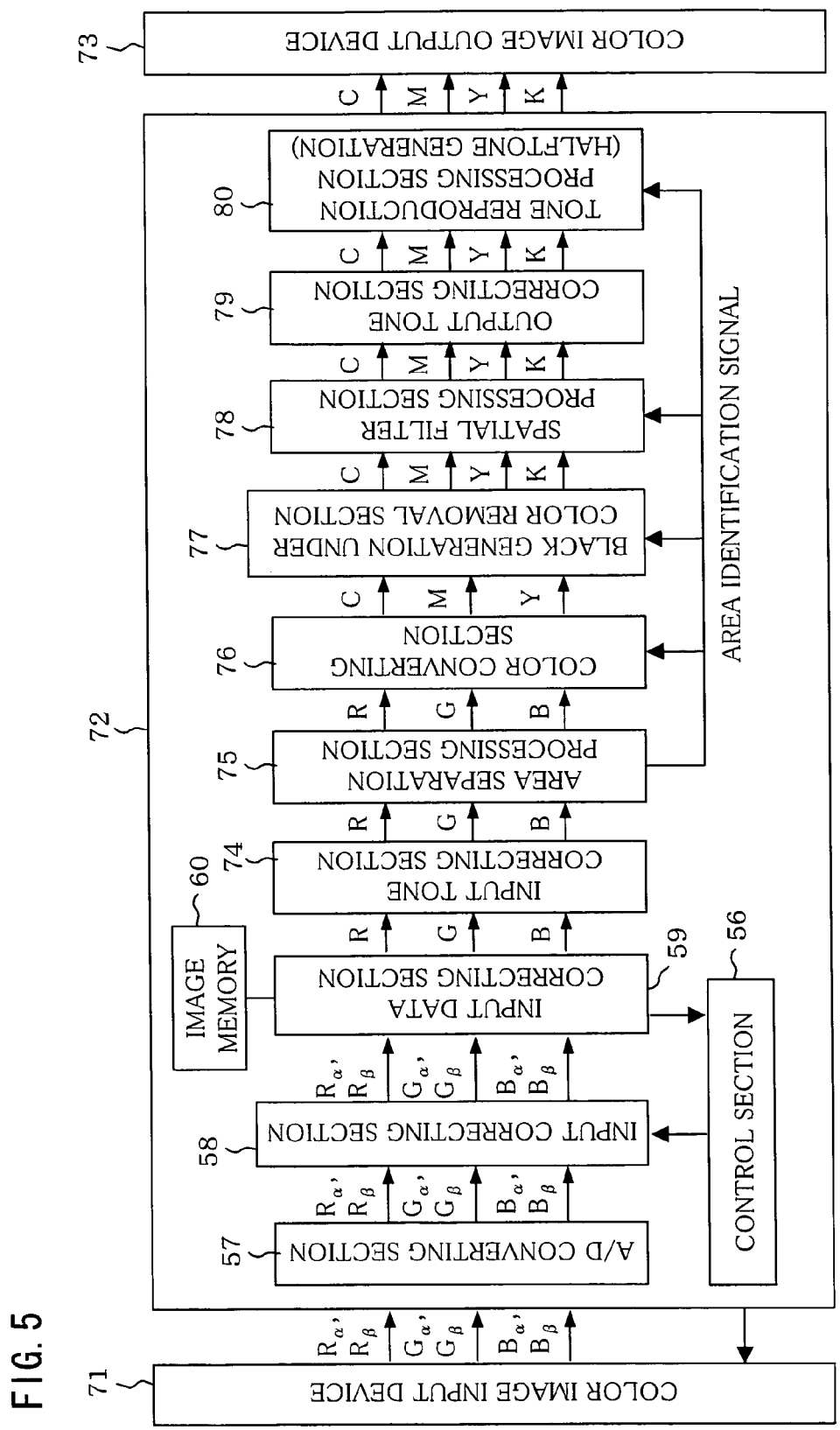
FIG. 5 is a block diagram showing how an image forming device including the image reading device is arranged.

Next, a digital copying machine of the present embodiment, which includes the scanner 50, will be explained. As shown in FIG. 5, the digital copying machine (image forming device) includes an image input device 71, a color image processing device (image processing device) 72, and a color image output device 73. Among these devices, the color image input device 71 and a part of the color image processing device 72 make up the scanner 50. In other words, the color image input device 71 in the digital copying machine corresponds to the color image input device 51 in the scanner 50, and the part of the color image processing device 72 corresponds to the image processing device 52 in the scanner 50. The following will explain an arrangement of the digital copying machine. Note that the explanation of arrangements similar to those in the scanner 50 will be omitted here.

In addition to the arrangement corresponding to the image processing device 52 in the scanner 50, the color image processing device 72 of the digital copying machine further includes an input tone correcting section 74, an area separation processing section 75, a color correcting section 76, a black generation undercolor removal section 77, a spatial filter processing section 78, an output tone correcting section 79, and a tone reproduction processing section 80. The color image processing device 72 is connected to the color image output device 73.

An analog signal read by the color image input device 71 is sent to the A/D converting section 57, the input correcting section 58, the input data converting section 59, the input tone correcting section 74, the area separation processing section 75, the color correcting section 76, the black generation undercolor removal section 77, the spatial filter processing section 78, the output tone correcting section 79, and the tone reproduction processing section 80 sequentially in this order in the color image processing device 72. The signal is then outputted, as a CMYK digital color signal, to the color image output device.

The A/D converting section 57, the input correcting section 58, and the input data converting section 59 are arranged as explained in the arrangement of the scanner 50. Note that, FIG. 5 shows the case where the input data converting section 59 converts input image data into an RGB signal. If the input image data is converted into an L*a*b* signal, an sRGB signal, or a similar signal as described above, this signal is outputted to the input tone correcting section 74 at a subsequent stage. Further, the above-explained conversion into a reference color space signal performed by the input data converting section 59 may be performed by the color correcting section 76 at a subsequent stage.

The input tone correcting section 74 carries out the processing for adjusting of image quality such as elimination of background and adjustment of contrast.

The area separation processing section 75 separates, in accordance with the RGB signal, respective pixels in the input image into either a character area, a screen area, or a photograph area. In accordance with a result of the separation, the area separation processing section 75 outputs to the color correcting section 76, the black generation undercolor removal section 77, the spatial filter processing section 78, and the tone reproduction processing section 80, an area identification signal indicating which area the pixel belongs to. Further, the area separation processing section 75 directly outputs to the color correcting section 76 at a subsequent stage, the input signal from the input tone correcting section 74.

In order to realize the color reproducibility, the color correcting section 76 carries out a necessary correction for eliminating color impurity including unnecessarily absorbed components according to spectral characteristics of CMY (C: cyan, M: magenta, and Y: yellow) color materials. Note that, the processing, for converting the input data signal into a reference color space data signal, which is performed by the input data converting section 59 as described above may be carried out by the color correcting section 76. In this case, each processing of the input tone correcting section 74 and the area separation processing section 75 is carried out with the use of the reading signal under either one of the light sources α and β, and therefore the reading signal under the other one of the light sources α and β is through. Further, in this case, the image memory 60 is included in the color correcting section 76.

Further, in the case where the input image data is converted into an L*a*b* signal, an sRGB signal, or a similar signal by the input data converting section 59 as described above, the color converting section 76 converts the L*a*b* signal, sRGB signal, or similar signal into a CMY signal.

The black generation undercolor removal section 77 performs (i) a black generation processing for generating a black (K) signal from the CMY three color signals after the color correction, and (ii) a processing for generating a new CMY signal by subtracting from the original CMY signal, the K signal obtained in the black generation processing. This allows the CMY three-color signal to be converted into a CMYK four-color signal.

As an example of the black generation processing, there is a method for generating black using skeleton black (typical method). In this method, the black generation undercolor removal processing is expressed as the following expressions:

$$\begin{cases} K' = f\{\min(C, M, Y)\} \\ C' = C - \alpha K' \\ M' = M - \alpha K' \\ Y' = Y - \alpha K' \end{cases}$$

where the input-output characteristics of a skeleton curve is indicated by y=f(x); C, M and Y are respectively input data; C', M', Y', and K are respectively output data; and a UCR (under color removal) ratio is α (0<α<1).

The spatial filter processing section 78 spatially processes the image data of the CMYK signal, supplied from the black generation undercolor removal section 77, by a digital filter in accordance with the area identification signal to eliminates a shade (fuzziness) or granular quality degradation of an output image by correcting a spatial frequency characteristic of the image data. Like the spatial filter processing section 78, the tone reproduction processing section 80 carries out a predetermined processing to the image data of the CMYK signal in accordance with the area identification signal.

For example, as to an area, which is separated into a character area by the area separation processing section 75, an enhancement with respect to the high frequency components is increased in a sharpness enhancement processing which is carried out during the spatial filtering process by the spatial filter processing section 78. This allows the reproducibility of black characters or color characters to be improved, in particular. At the same time, the tone reproduction processing section 80 selects either a processing for conversion into a binary data or a processing for conversion into a multivalued data for a high resolution screen suitable for reproducing of the characters at high frequencies.

Further, as to an area, which is separated into a screen area by the area separation processing section 75, the spatial filter processing section 78 carries out a low pass filtering process for eliminating inputted screen components. The output tone correcting section 79 performs an output tone correction processing in which a signal such as a density signal is converted into a screen area ratio indicative of a characteristic value of the color image output device. Thereafter, the tone reproduction processing section 80 carries out a tone reproduction processing (halftone generation) in which the image is ultimately separated into pixels so that the respective tones are reproduced. As to an area, which is separated into a photograph area by the area separation processing section 75, either a processing for conversion into a binary data or a processing for conversion into a multivalued data is carried out for a screen which attaches importance to the tone reproducibility.

The image data to which each of the processing is carried out as described above is temporarily stored in storage means, and is supplied to the color image output device 73 after it is read out at a predetermined timing. The color image output device 73 outputs image data onto a recording medium (such as paper, for example). The color image output device 73 may be, but not limited to, a color image output device of an electrophotographic type or an inkjet type. Note that, each processing as described above is controlled by a CPU (central processing unit; not shown).

Further, the present invention can be provided (i) as a program that causes a computer to perform the image processing in which it is detected whether a color-unmatch occurs and, if a color-unmatch occurs, then an appropriate color conversion is carried out or (ii) as a computer-readable recording medium containing such a program. As a result, it is possible to provide a portable recording medium containing a program for performing an image processing method in which it is detected whether or not a color-unmatch occurs and, if a color-unmatch occurs, then an appropriate color conversion is carried out.

Note that, as the recording medium, the present invention may use a program medium including a memory such as ROM (not shown) or a recording medium readable by being inserted into a program reading device provided as an external storing device (not shown), because the processing is performed by a microcomputer.

In either case, the stored program may be executed by access of a microprocessor. Alternatively, in either case, the program may be executed after it is read out and then downloaded on a program storage area (not shown) which is configured in a microcomputer. The program for downloading is pre-stored in the main unit.

Here, the program medium may be a recording medium arranged to be detachable from the main unit. The recording medium may be a medium fixedly carrying a program, including a tape type such as a magnetic tape or a cassette tape; a disk type including a magnetic disk such as a floppy (registered trademark) disk or a hard disk, and an optical disk such as CD-ROM, MO, MD, and/or DVD; a card type such as an IC card (including a memory card) or an optical card; a semiconductor memory such as mask ROM, EPROM (Erasable Programmable Read Only Memory), EEPROM (Electrically Erasable Programmable Read Only Memory), or flash ROM.

Further, in the present invention, the image forming device may have a system configuration connectable with a communication network including the Internet, and the recording medium may be a medium fluidly carrying a program so as to download the program from the communication network. Note that, if the program is downloaded from a communication network as described above, then a program for downloading may be either pre-stored in the main unit or installed from another recording medium.

The image processing method as described above is executed in response to reading of the recording medium by a program reading device provided in a digital color image forming device or a computer system.

The computer system includes an image input device such as a flatbed scanner, a film scanner, and a digital camera; a computer which performs, by loading a predetermined program, various types of processing such as the above-described image processing method; an image display device such as a CRT display or a liquid crystal display, which displays processing results of the computer; and a printer which outputs onto paper, etc., the processing results of the computer. The computer system further includes a modem, network card, or other device as communications means for connecting to a server, etc., via a network.

As described above, an image processing device of the present invention, in which a plurality of image data obtained by reading an original under a plurality of different reading conditions is used as a set of input image data, includes a data converting section for correcting the set of input image data based on the plurality of image data contained therein, so as to prevent a color-unmatch in output image data.

Conventionally (Tokukai 2002-94814), the presence or absence of a color-unmatch has been determined by reading an original under different conditions. However, these image data of the original are individually used in the correction for suppressing the color-unmatch, when the color-unmatch occurs.

On the other hand, with the foregoing arrangement, the correction of image data is performed in accordance with a plurality of image data read under a plurality of different conditions. Therefore, it is possible to perform the conversion more accurately (without causing a color-unmatch), as compared with the case where the image data with a (possible) color-unmatch are individually used for the conversion. The image quality of the output image will never deteriorate due to the color-unmatch.

Another image processing device of the present invention, in which a plurality of image data obtained by reading an original under a plurality of different reading conditions is used as a set of input image data, includes a data converting section for selecting specific image data from the set of input image data and correcting the set of input image data based on the selected image data so as to prevent a color-unmatch in output image data.

With this arrangement, the correction of image data for preventing a color-unmatch is performed based on a plurality of image data read under a plurality of different conditions. Thus, it is possible to carry out the conversion more accurately, as compared with the case where the image data with a color-unmatch are individually used for the conversion.

The data converting section selects specific image data from the set of input image data, and corrects the image data based on the selected image data so as to prevent a color-unmatch. As such, it is possible to reduce calculated amount involved in the correction, as compared with the case where all of the image data in the set of input image data are used for the calculation.

The image processing device may be arranged so that, in the correction process for preventing a color-unmatch, the data converting section converts image data in the set of input image data into image data of a reference color space.

Further, the image processing device may be arranged to include a judging section for judging the presence or absence of a color-unmatch by comparing the plurality of image data in the set of input image data, wherein, when the judging section finds a color-unmatch in the set of input image data, the data converting section corrects the color-unmatch based on the plurality of image data contained in the set of input image data.

Further, the image processing device may be arranged so that the judging section determines the presence or absence of a color-unmatch by calculating an absolute value of a difference between image data read under different reading conditions, and by comparing the resultant absolute value of the difference with a threshold.

With this arrangement, the image data read under different reading conditions in, for example, pre-scanning are compared to one another to calculate a difference value, and the difference value is compared with a threshold. (The absolute value of a difference in the respective components of the image data read under different reading conditions, and it is judged that a color-unmatch occurs when any of the absolute values is equal to or greater than the threshold.) In this way, it is possible to judge whether or not a difference in the data of the original read under different reading conditions, i.e., the presence or absence of a color-unmatch (whether or not a color-unmatch occurs).

An image reading device of the present invention includes reading means for reading an original to obtain image data, and image processing means for carrying out image processing to correct the image data read by the reading means so as to prevent a color-unmatch in the image data. The image processing means is realized by the image processing device.

With this arrangement, as in the foregoing image processing device, it is possible to perform the conversion with high accuracy (without causing a color-unmatch). The image quality of the output image will never deteriorate due to the color-unmatch.

The image reading device may be arranged so that the reading means obtains a set of input image data under a plurality of different reading conditions, using a plurality of light sources with different spectral distributions.

An image forming device of the present invention includes image processing means for carrying out image processing to correct input image data so as to prevent a color-unmatch in the input image data, and output means for carrying out a print job by outputting the image data corrected by the image processing means. The image processing means is realized by the image processing device.

With this arrangement, as in the foregoing image processing device, it is possible to perform the conversion with high accuracy (without causing a color-unmatch). The image quality of the output image will never deteriorate due to the color-unmatch.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing device, in which first image data obtained by reading an original under a first reading condition and second image data obtained by reading the original under a second reading condition are used as a set of input image data, said image processing device comprising:

a judging section for judging the presence or absence of a color-unmatch by comparing the first image data and the second image data in terms of at least one color component signal; and a data converting section for converting, into image data of a reference color space, the first image data and the second image data in the set of input image data by using at least one color component signal in the first image data and at least one color component signal in the second image data, in a case where the judging section finds a color-unmatch between the first image data and the second image data.

2. The image processing device as set forth in claim 1, wherein the judging section determines the presence or absence of a color-unmatch by calculating an absolute value of a difference between image data read under different reading conditions, and by comparing the resultant absolute value of the difference with a threshold.

3. An image reading device comprising:

a reading section for reading an original to obtain image data; and an image processing device for carrying out image processing to correct the image data read by the reading section, the image processing device in which first image data obtained by reading the original under a first reading condition and second image data obtained by reading the original under a second reading condition are used as a set of input image data, said image processing device comprising:

a judging section for judging the presence or absence of a color-unmatch by comparing the first image data and the second image data in terms of at least one color component signal; and a data converting section for converting into image data of a reference color space, the first image data and the second image data in the set of input image data by using at least one color component signal in the first image data and at least one color component signal in the second image data, in a case where the judging section finds a color-unmatch between the first image data and the second image data.

4. The image reading device as set forth in claim 3, wherein the reading section obtains a set of input image data under a plurality of different reading conditions, using a plurality of light sources with different spectral distributions.

5. An image forming device comprising:

an image processing device for carrying out image processing to correct input image data; and an output section for carrying out a print job by outputting the image data corrected by the image processing device, the image processing device in which first image data obtained by reading an original under a first reading condition and second image data obtained by reading the original under a second reading condition are used as a set of input image data, said image processing device comprising:

a judging section for judging the presence or absence of a color-unmatch by comparing the first image data and the second image data in terms of at least one color component signal; and a data converting section for converting into image data of a reference color space, the first image data and the second image data in the set of input image data by using at least one color component signal in the first image data and at least one color component signal in the second image data, in a case where the judging section finds a color-unmatch between the first image data and the second image data.

6. An image processing method, in which first image data obtained by reading an original under a first reading condition and second image data obtained by reading the original under a second reading condition are used as a set of input image data, said method comprising the steps of:

judging the presence or absence of a color-unmatch by comparing the first image data and the second image data in regard to at least one color component signal; and converting into image data of a reference color space, the first image data and the second image data in the set of input image data by using at least one color component signal in the first image data and at least one color component signal in the second image data, in a case where the judging step finds a color-unmatch between the first image data and the second image data.

7. A computer executable program stored in a computer readable medium in which first image data obtained by reading an original under a first reading condition and second image data obtained by reading the original under a second reading condition are used as a set of input image data, said program causing a computer to carry out the steps of:

judging the presence or absence of a color-unmatch by comparing the first image data and the second image data in regard to at least one color component signal; and converting into image data of a reference color space, the first image data and the second image data in the set of input image data by using at least one color component signal in the first image data and at least one color component signal in the second image data, in a case where the judging step finds a color-unmatch between the first image data and the second image data.

8. A computer readable recording medium storing a computer-executable program, said program causing a computer to carry out the steps of:

judging the presence or absence of a color-unmatch by comparing the first image data and the second image data in regard to at least one color component signal; and converting into image data of a reference color space, the first image data and the second image data in the set of input image data by using at least one color component signal in the first image data and at least one color component signal in the second image data, in a case where the judging step finds a color-unmatch between the first image data and the second image data.

* * * * *

UNITED STATES PATENT AND TRADEMARK OFFICE
CERTIFICATE OF CORRECTION

| | |
|---|---|
| PATENT NO. | : 7,548,341 B2 |
| APPLICATION NO. | : 10/889853 |
| DATED | : June 16, 2009 |
| INVENTOR(S) | : Makio Gotoh, Kenji Kimura and Masanori Minami |

It is certified that error appears in the above-identified patent and that said Letters Patent is hereby corrected as shown below:

Column 20, line 30, Claim 7 should read -- A computer executable program fixedly stored --; and Lines 46-58, Claim 8 should be cancelled.

Signed and Sealed this
Twenty-third Day of August, 2011

David J. Kappos
*Director of the United States Patent and Trademark Office*